United States Patent [19]

Sizer, II et al.

[11] Patent Number: 6,021,432
[45] Date of Patent: Feb. 1, 2000

[54] SYSTEM FOR PROCESSING BROADCAST STREAM COMPRISES A HUMAN-PERCEPTIBLE BROADCAST PROGRAM EMBEDDED WITH A PLURALITY OF HUMAN-IMPERCEPTIBLE SETS OF INFORMATION

[75] Inventors: Theodore Sizer, II, Little Silver; Katherine G. August, Matawan; Charles D. Caldwell, Cliffwood Beach; Robert F. Henrick, Basking Ridge, all of N.J.

[73] Assignee: Lucent Technologies Inc., Murray Hill, N.J.

[21] Appl. No.: 08/795,743

[22] Filed: Feb. 6, 1997

Related U.S. Application Data

[63] Continuation-in-part of application No. 08/599,500, Jan. 25, 1996, Pat. No. 5,663,766, which is a continuation of application No. 08/332,226, Oct. 31, 1994, abandoned.

[51] Int. Cl.[7] .................................................... G06F 13/00
[52] U.S. Cl. ............................................... 709/217; 348/7
[58] Field of Search ........................ 395/200.49, 200.61, 395/200.36, 200.47, 200.59; 348/7, 10, 12; 709/200, 201, 203, 217, 218, 219

[56] References Cited

U.S. PATENT DOCUMENTS

| | | | |
|---|---|---|---|
| 3,984,775 | 10/1976 | Cariel et al. | 375/259 |
| 4,070,697 | 1/1978 | Miller et al. | 360/12 |
| 4,170,760 | 10/1979 | Umeda | 455/194.1 |
| 4,780,757 | 10/1988 | Bryer et al. | 348/7 |
| 5,036,394 | 7/1991 | Morii et al. | 348/468 |
| 5,121,476 | 6/1992 | Yee | 348/559 |
| 5,245,656 | 9/1993 | Loeb et al. | 380/23 |
| 5,247,575 | 9/1993 | Sprague | 380/9 |
| 5,410,326 | 4/1995 | Goldstein | 348/734 |
| 5,412,719 | 5/1995 | Hamamoto et al. | 380/9 |
| 5,428,778 | 6/1995 | Brookes | 707/5 |
| 5,481,296 | 1/1996 | Cragun et al. | 348/13 |
| 5,579,124 | 11/1996 | Aijala et al. | 386/96 |
| 5,617,565 | 4/1997 | Augenbraun et al. | 707/4 |
| 5,659,653 | 8/1997 | Diehl et al. | 386/46 |
| 5,724,567 | 3/1998 | Rose et al. | 707/2 |
| 5,742,769 | 4/1998 | Lee et al. | 709/206 |
| 5,761,662 | 6/1998 | Dasan | 707/10 |
| 5,794,210 | 8/1998 | Goldhaber et al. | 705/14 |
| 5,813,006 | 9/1998 | Polnerow et al. | 707/10 |
| 5,842,010 | 11/1998 | Jain et al. | 707/104 |
| 5,848,396 | 12/1998 | Gerace | 705/10 |

*Primary Examiner*—Moustafa M. Meky

[57] ABSTRACT

A broadcast stream contains different types of information with the different types identified in the stream. An information processing device receives the broadcast stream and selectively captures (for future playback) only those pieces of information corresponding to one or more preselected types of information. In one embodiment, the broadcast stream is a radio broadcast and the different types are identified in digital sidebands of the radio signals. In other embodiments, the broadcast stream is embedded into audio signals or video signals using luminance or chrominance modulation or other spread spectrum techniques. A user is able to edit a personal profile that is stored in the device and contains the list of preselected types of information. In one embodiment, the device has an interface that allows the user to edit the personal profile, for example, by connecting the device to a personal computer running a profile-editing software program or by communicating with a service bureau that provides the profile-editing function. In this way, each information processing device can be programmed to capture only the subset of information in the broadcast stream in which the user is interested.

29 Claims, 2 Drawing Sheets

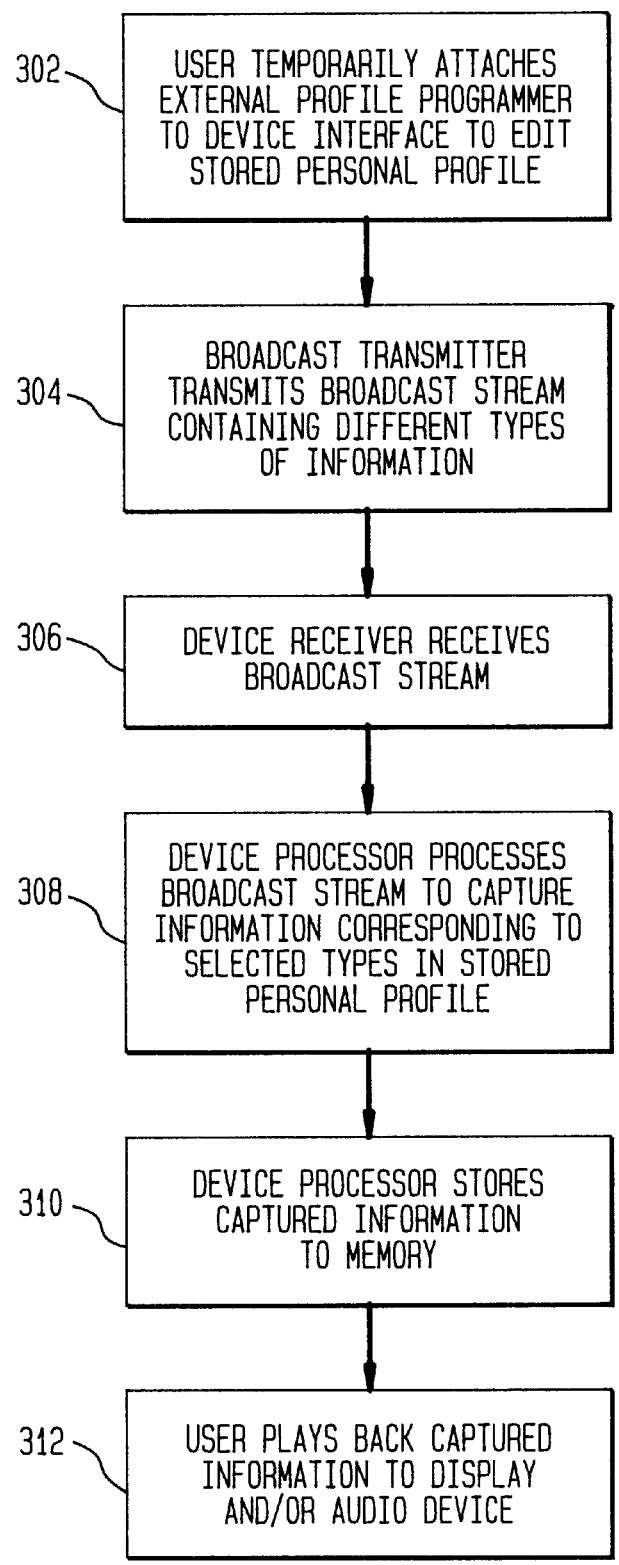

SYSTEM FOR PROCESSING BROADCAST STREAM COMPRISES A HUMAN-PERCEPTIBLE BROADCAST PROGRAM EMBEDDED WITH A PLURALITY OF HUMAN-IMPERCEPTIBLE SETS OF INFORMATION

This is a continuation-in-part of U.S. patent application Ser. No. 08/599,500, filed on Jan. 25, 1996 and issued as U.S. Pat. No. 5,663,766 on Sep. 2, 1997, which is itself a continuation of U.S. patent application Ser. No. 08/332,226, filed on Oct. 31, 1994 and now abandoned.

BACKGROUND OF THE INVENTION

1. Field of the Invention

The present invention relates to communications, and, in particular, to the transmission, receipt, and processing of broadcast information.

2. Description of the Related Art

Daily newspapers are typically written to provide information on a wide variety of topics, including news about local, state, national, and international events, sports, weather, business, entertainment, and even classified advertisements. Most people, however, are interested in only a subset of the total information in a newspaper. Furthermore, different people are interested in different subsets of information. One person may be interested in sports and local news, but not the weather. Or in one particular sports team but not another. Yet another person may be interested in the weather and entertainment, but not sports.

Nevertheless, all of these people typically have only one choice: in order to acquire a particular subset of information, each person must purchase the entire newspaper, in effect paying for extra information in which they are not interested.

It would be advantageous to provide a mechanism by which people could acquire only those subsets of information in which they are interested without having to pay for or otherwise bother with other undesired information.

Further objects and advantages of this invention will become apparent from the detailed description which follows.

SUMMARY OF THE INVENTION

The present invention is directed to the processing of broadcast information. In particular, a broadcast stream comprising information of one or more different types is received and analyzed to select (for further processing) a subset of information in the broadcast stream corresponding to one or more types of information preselected from a plurality of available types of information.

According to one embodiment, a information processing device comprises a receiver, a processor, a memory, and a playback device. The receiver is capable of receiving a broadcast stream comprising a plurality of different types of data. The processor is capable of processing the broadcast stream to capture data corresponding to a selected subset of the different types of data, and storing the captured data to the memory. The playback device is capable of playing back the captured data from the memory.

According to yet another embodiment, pieces of information corresponding to one or more different types of information are generated and a label is assigned to each of the different types of information. A broadcast stream comprising the pieces of information is generated with a label for each piece. The broadcast stream is transmitted for receipt, processing, and selective capturing by one or more information processing devices.

BRIEF DESCRIPTION OF THE DRAWINGS

Other objects, features, and advantages of the present invention will become more fully apparent from the following detailed description, the appended claims, and the accompanying drawings in which:

FIG. 3 is a flow diagram of the processing of the communications system of FIG. 1 and of the information processing device of FIG. 2.

DETAILED DESCRIPTION

The present invention relates to a communications system in which a broadcast transmitter transmits a broadcast stream containing a variety of different types of information. One or more information processing devices receive this broadcast stream and capture only those pieces of information that correspond to preselected types of information listed in a personal profile stored in each device. The device provides a mechanism by which the personal profile can be edited to reflect the current set of information that the user wishes to acquire.

Figure 1:
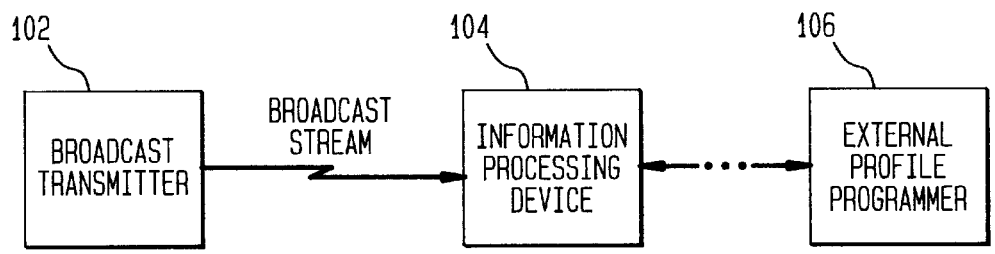
FIG. 1 is a block diagram of a communications system, according to one embodiment of the present invention.

Referring to FIG. 1, there is shown a block diagram of a communications system, according to one embodiment of the present invention. The communications system of FIG. 1 comprises broadcast transmitter 102, information processing device 104, and external profile programmer 106.

Figure 2:
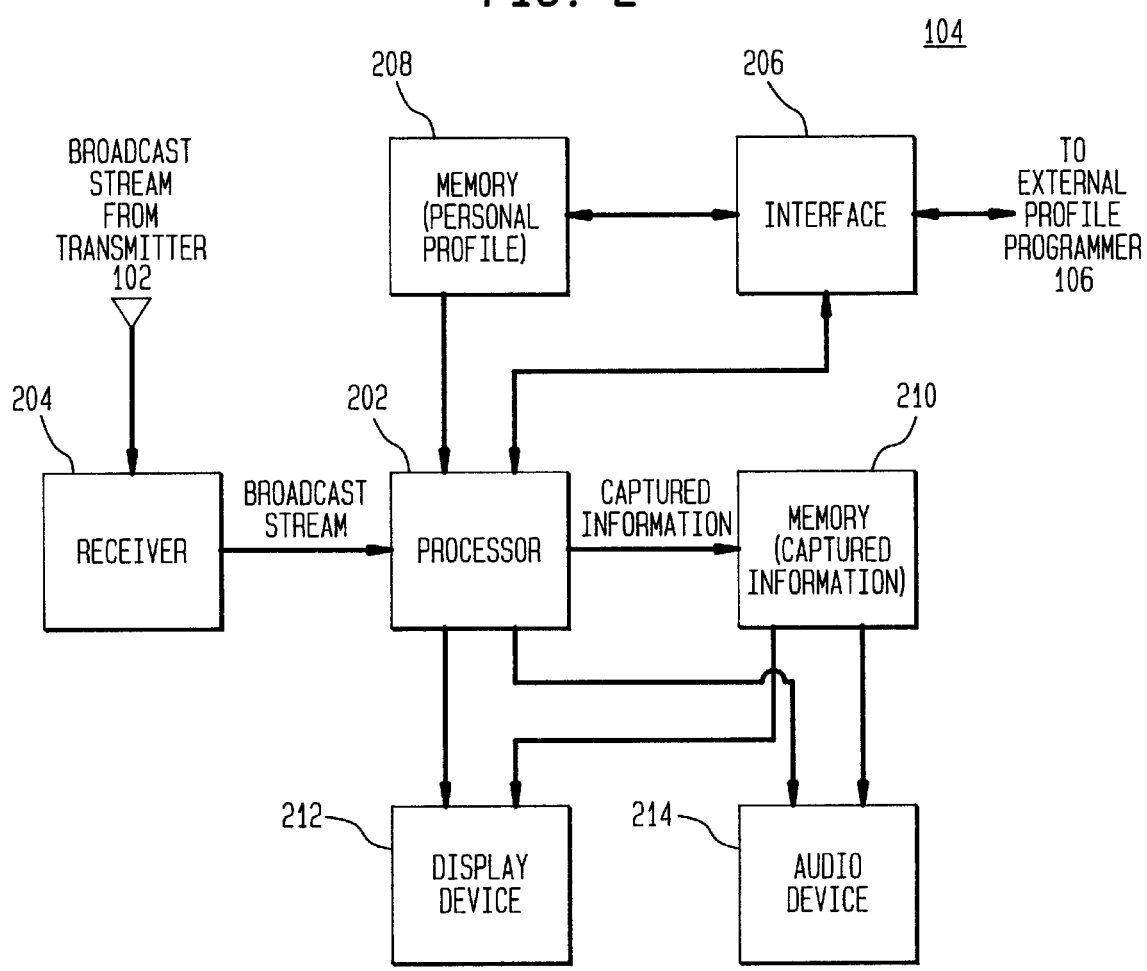
FIG. 2 is a block diagram of the information processing device of FIG. 1.

Referring now to FIG. 2, there is shown a block diagram of information processing device 104 of FIG. 1, according to one embodiment of the present invention. Device 104 comprises processor 202, radio receiver 204, interface 206, memories 208 and 210, display device 212, and audio device 214. Memories 208 and 210, which may be distinct memory devices or part of a single memory device, are any suitable storage means, such as random access memory (RAM) devices.

Referring now to FIG. 3, there is shown a flow diagram of the processing of the communications system of FIG. 1 and of information processing device 104 of FIG. 2, according to one embodiment of the present invention.

With reference to FIGS. 1–3, as indicated, external profile programmer 106 of FIG. 1 may be any suitable device, such as a personal computer that executes an application software program, designed to enable a user to access and edit a personal profile stored in memory 208 of FIG. 2. The personal profile identifies the types of information that the user is interested in acquiring. In this embodiment, the user of device 104 attaches external profile programmer 106 to interface 206 of FIG. 2 to edit the stored personal profile (step 302 of FIG. 3). After the personal profile has been edited, the user may (but does not have to) detach device 104 from programmer 106 for portable use.

Broadcast transmitter 102 of FIG. 1 transmits a broadcast stream containing different types of information (step 304 of FIG. 3). As a broadcast stream, the information is potentially available to any number of users of devices like information processing device 104. In this embodiment, the broadcast stream is continuously transmitted with the different types of information in the stream identified in digital sidebands of frequency modulated (FM) radio broadcast signals. For fraud protection, the digital sidebands that support this information transfer are changed periodically and reloaded to the devices.

Receiver 204 of FIG. 2 receives the broadcast stream (step 306 of FIG. 3) and processor 202 of FIG. 2 monitors the received broadcast stream to extract those pieces of information that correspond to the selected types of information identified in the personal profile stored in memory 208 of FIG. 2 (step 308 of FIG. 3). In this embodiment, each piece of information in the broadcast stream has associated with it a label that identifies the type or category to which the information belongs. For example, all pieces of information related to sports may have a label encoded in the broadcast stream that starts with the letter "S." For those pieces dealing with professional baseball, the label may start with "SBB" followed by a number that identifies the particular team. The personal profile of a person who is interested in only one particular baseball team will have the corresponding label listed in his or her personal profile. Processor 202 will retrieve the label for each piece of information in the broadcast stream and compare it to the personal profile stored in memory 208 to determine whether there is a match.

If there is a match, then processor 202 will store that particular piece of information to memory 210 of FIG. 2 (step 310 of FIG. 3), for future manual playback by the user (step 312 of FIG. 3). Each piece of information includes audio and/or textual information. As such, playback includes display of textual information on display device 212 of FIG. 2 (e.g., a liquid crystal display device) or playing of audio information on audio device 214 of FIG. 2 or both. Device 104 could also be configured with a printer device (not shown) providing text and/or graphics printout of the captured information.

The present invention provides a mechanism by which each individual user can individually program his or her own information processing device 104 to capture only the subset of information in a broadcast stream in which the user is interested. Each user can select his or her own personal set of information and not have to deal with other undesired information in the broadcast stream.

Information processing device 104 preferably provides the user with the ability to enable or disable real-time notification. For real-time notification, device 104 vibrates, generates an audio alarm (e.g., a beep) or a visual alarm (e.g., a flashing light), or otherwise notifies the user every time a piece of information is captured from the broadcast stream. If this option is disabled or otherwise not available, device 104 writes captured information to memory 210 of FIG. 2, overwriting if necessary the oldest information in the queue, to await manual access by the user. The user would have the option to save particular pieces of information for future recall thereby preventing those pieces from being overwritten by subsequently captured information.

In the embodiment of FIG. 2, information processing device 104 is connected to external profile programmer 106 to program the personal profile. In alternative embodiments, information processing devices of the present invention are able to communicate with a centralized service bureau (not shown) which would perform the function of programming the stored personal profile. Such communication could be either wired or wireless, depending on the implementation. In such embodiments, interface 206 of FIG. 2 could be a paging modem, a telephone modem, or a dual tone multiple frequency (DTMF) receiver or transceiver, as appropriate. In yet another embodiment, the profile editing capability could be built into the information processing device, which would then not need to communicate with an external device for profile programming.

In the embodiment of FIGS. 1–2, the broadcast stream is an FM radio frequency signal transmitted over airwaves by broadcast transmitter 102 and received at receiver 204 of FIG. 2. Those skilled in the art will understand that other broadcast media, besides FM radio frequency signals, are also possible. These include but are not necessarily limited to paging channels or television signals transmitted over airwaves or via cable. In addition, digital data can be imperceptibly embedded into standard audio or video signals using such techniques as luminance or chrominance modulation or spread spectrum techniques. See, for example, U.S. application Ser. No. 08/599,500 ("the '500 application), filed Jan. 25, 1996, now U.S. Pat. No. 5,663,766, the teachings of which are incorporated herein by reference. The information contained in the broadcast stream could be any conceivable information that might be desired by users, including, but not limited to, all of the information typically contained in newspapers as well as other (potentially more timely) information, such as traffic reports and weather advisories.

In the embodiments of FIGS. 1–2, the broadcast stream is separate from the stream that supports the personal profile programming function. In alternative embodiments, these two streams are transmitted over the same medium and received by a device component that provides the functionality of both receiver 204 and interface 206 of FIG. 2.

In one embodiment, information processing device 104 is a portable device that also provides the functionality of a personal paging device (i.e., a pager) that notifies a user that someone is trying to reach the user. In this embodiment, the hardware of device 104 may be based on that of conventional personal paging devices. Those skilled in the art will understand that differences lie at least in part in how processor 202 of FIG. 2 is programmed, in how the personal profile stored in memory 208 of FIG. 2 is defined, and in the addition of interface 206 of FIG. 2. Processor 202 may be a programmable microprocessor or a digital signal processing (DSP) integrated circuit (IC) or any other suitable device for performing the functions of the present invention. In alternative embodiments, device 104 may be a stationary device rather than a portable one.

In some embodiments, receiver 204 of FIG. 2 continuously receives the broadcast stream and processor 202 of FIG. 2 continuously monitors the received broadcast stream to extract those pieces of information that correspond to the selected types of information identified in the personal profile stored in memory 208 of FIG. 2. In other embodiments, the broadcast stream is not continuously available for receipt and processing by device 104. For example, when digital data is embedded in the luminance or chrominance levels of a video signal, as described in the '500 application, the broadcast stream is available only to those devices 104 that are in the proximity of a television monitor that is displaying the encoded video signal. In this case, the broadcast stream received by device 104 is the video signal generated by the television monitor. The video signal corresponds to playback signals displayed on the television monitor and corresponding to a television signal received by conventional means (e.g., cable, VCR, airwaves). The playback signals contain both public information (i.e., the images displayed on the television monitor for all to see) and private information (i.e., data encoded in the luminance or chrominance of the displayed video). In these embodiments, the television monitors can be used as public/private bulletin boards, where the monitor displays the video signal as the public information and device 104 is used to retrieve preselected private information embedded in the video signal.

For example, in an airport terminal, a monitor may display video signals corresponding to flight schedules. Embedded in those video signals would be the flight information for each of the travelers on each of the listed flights. An individual traveler retrieves his or her personal flight information using device 104, which captures the personal flight information from the displayed video signals.

According to the present invention, traditional media (e.g., television, radio, video, terminals) are able to carry incremental data beyond the perception of humans. Nevertheless, that data may be retrieved with a relatively inexpensive portable device, such as device 104, that need not be hardwired to one machine.

When a person attends a conference, travels through an airport, stays at a hotel, visits an amusement park, he or she is not likely to be in a position to be reached via traditional messaging methods. However, there are usually video display monitors in these places with public information displayed. According to embodiments of the present invention, a person passing through an airport is able to retrieve messages that are addressed specifically to him or her. Software within device 104 is programmed to sift through large amounts of data and identify messages from public bulletin boards that are meant for an individual, or class of customer, such as a group traveling together. When the traveler holds device 104 up to the terminal, the device will capture only the embedded data that is addressed to the individual or group to which that individual belongs.

The broadcast of such signals can be either local to the monitor, through a closed television system as within a hotel or resort, transmitted via telephone lines, transmitted via local or national broadcast, transmitted by a cable front end, satellite, video tape, computer system, local area network, wide area network, or any other suitable source.

In certain embodiments, a person, subscribing to a messaging service based on the present invention, would call a special number from a screen phone or kiosk in an airport or other travel location to retrieve and capture electronic mail and voice messages using device 104. These messages are in a convenient format. There is no need to write things down, listen to long messages, or miss a connection.

Furthermore, a person wishing to leave a message for an individual subscribing to such a messaging service may leave such a message via electronic mail using a service device equipped with a keyboard. The electronic mail may be forwarded to a special mailbox used for travel by the subscriber. The public mailbox may be posted for attendees of a conference to receive messages.

A predetermined list of appropriate messages may be put into a menu on a voice response unit or manual-assisted system so that a message can be constructed from its components. These components when strung together should provide all the information for a message such as call back number, subject, name, etc. Retrieval of such messages may be done at any time, at the convenience of the recipient, in the privacy of a hotel room or with the privacy of an individual device. Once the message has been retrieved, the call-back number is offered on an auto-dial function of the device so that the subscriber can return the phone call.

In the same manner that data can be embedded in the image of a video display, data can also be embedded into the audio of a television or radio signal. Low sounds can be distinguished using a device equipped with a special microphone and data capture component. In addition to being able to receive messages as described above, such devices also receive and sift through data sent via a car radio or other sound source. A radio, computer, television, or other sound emitting device can be sent data for one person or for a group of individuals such as a travel group. The receiving device discriminates the embedded data in the audio and retrieves the messages addressed to or selected by the user of the device.

It will be further understood that various changes in the details, materials, and arrangements of the parts which have been described and illustrated in order to explain the nature of this invention may be made by those skilled in the art without departing from the principle and scope of the invention as expressed in the following claims.

What is claimed is:

1. A method for processing broadcast information, comprising the steps of:
    (a) receiving, by an information processing device, a broadcast stream comprising a human-perceptible broadcast program embedded with a plurality of human-imperceptible sets of information, each set of information corresponding to one of a plurality of available types of information, wherein:
        the human-perceptible broadcast program can be directly perceived by a person; and
        the information in the human-imperceptible sets of information cannot be directly conveyed to a person without first being processed by an information processing device;
    (b) automatically analyzing, by the information processing device, the broadcast stream to identify a subset of information in the broadcast stream corresponding to one or more preselected types of information identified in a personal profile stored in the information processing device; and
    (c) processing, by the information processing device, the subset of information to present the subset of information in a human-perceptible form to a user.

2. The method of claim 1, wherein the sets of information are embedded into human-perceptible audio sound signals or human-perceptible video light signals using luminance or chrominance modulation or spread spectrum techniques.

3. The method of claim 1, wherein the personal profile was edited using an external profile programmer in communication with the information processing device.

4. The method of claim 1, wherein step (c) comprises the step of recording the subset of information for playback in a human-perceptible form, wherein the playback comprises at least one of displaying textual information and playing audio information.

5. The method of claim 1, wherein:
    the broadcast stream comprises playback signals comprising human-perceptible public information and human-imperceptible private information, wherein the private information is encoded within the playback signals;
    step (b) comprises the step of analyzing the playback signals to extract a subset of the encoded private information selected for the user; and
    step (c) comprises the step of decoding the extracted subset of encoded private information to make the private information available to the user in a human-perceptible form.

6. The method of claim 5, wherein the playback signals comprise at least one of:
    (1) human-perceptible audio sounds received from a speaker, private information being encoded in the audio sounds; and (2) human-perceptible video light received from a video monitor, private information being encoded in the luminance or chrominance of the video light.

7. An apparatus for processing broadcast information, comprising:
 (a) means for receiving a broadcast stream comprising a human-perceptible broadcast program embedded with a plurality of human-imperceptible sets of information, each set of information corresponding to one of a plurality of available types of information, wherein:
 the human-perceptible broadcast program can be directly perceived by a person; and
 the information in the human-imperceptible sets of information cannot be directly conveyed to a person without first being processed by an information processing device;
 (b) means for automatically analyzing the broadcast stream to identify a subset of information in the broadcast stream corresponding to one or more preselected types of information identified in a personal profile stored in the apparatus; and
 (c) means for processing the subset of information to present the subset of information in a human-perceptible form to a user.

8. The apparatus of claim 7, wherein the sets of information are embedded into human-perceptible audio sound signals or human-perceptible video light signals using luminance or chrominance modulation or spread spectrum techniques.

9. The apparatus of claim 7, wherein the personal profile was edited using an external profile programmer in communication with the apparatus.

10. The apparatus of claim 7, wherein means (c) is adapted to record the subset of information for playback in a human-perceptible form, wherein the playback comprises at least one of displaying textual information and playing audio information.

11. The apparatus of claim 7, wherein:
 the broadcast stream comprises playback signals comprising human-perceptible public information and human-imperceptible private information, wherein the private information is encoded within the playback signals;
 means (b) is adapted to analyze the playback signals to extract a subset of the encoded private information selected for the user; and
 means (c) is adapted to decode the extracted subset of encoded private information to make the private information available to the user in a human-perceptible form.

12. The apparatus of claim 11, wherein the playback signals comprise at least one of:
 (1) human-perceptible audio sounds received from a speaker, private information being encoded in the audio sounds; and
 (2) human-perceptible video light received from a video monitor, private information being encoded in the luminance or chrominance of the video light.

13. An information processing device, comprising:
 (a) a receiver;
 (b) a processor;
 (c) a memory; and
 (d) a playback device, wherein:
 the information processing device has a personal profile corresponding to a user and stored in the memory, wherein the personal profile is adapted to be programmed to preselect one or more types of information from a plurality of available types of information;
 the receiver is adapted to receive a broadcast stream comprising a human-perceptible broadcast program embedded with a plurality of human-imperceptible sets of information, each set of information corresponding to one of the plurality of available types, wherein:
 the human-perceptible broadcast program can be directly perceived by a person; and
 the information in the human-imperceptible sets of information cannot be directly conveyed to a person without first being processed by an information processing device;
 the processor is adapted to automatically analyze the broadcast stream to identify a subset of information in the broadcast stream corresponding to the preselected types identified in the personal profile; and
 the processor is adapted to store the subset of information to the memory; and
 the playback device is adapted to play back the subset of information from the memory to present the subset of information in a human-perceptible form to the user.

14. The device of claim 13, wherein the sets of information are embedded into human-perceptible audio sound signals or human-perceptible video light signals using luminance or chrominance modulation or spread spectrum techniques.

15. The device of claim 13, wherein the playback device comprises at least one of a display device adapted to display human-perceptible text and an audio device adapted to play human-perceptible audio sounds.

16. The device of claim 13, wherein the information processing device is further adapted to function as a portable personal paging device.

17. The device of claim 13, further comprising an interface, wherein
 the interface is adapted to connect to an external profile programmer to enable the user to edit the personal profile.

18. The device of claim 13, wherein:
 the broadcast stream comprises playback signals comprising human-perceptible public information and human-imperceptible private information, wherein the private information is encoded within the playback signals;
 the processor is adapted to analyze the playback signals to extract a subset of the encoded private information selected for the user; and
 the processor is adapted to decode the extracted subset of encoded private information to make the private information available to the user in a human-perceptible form.

19. The device of claim 18, wherein the playback signals comprise at least one of:
 (1) human-perceptible audio sounds received from a speaker, private information being encoded in the audio sounds; and
 (2) human-perceptible video light received from a video monitor, private information being encoded in the luminance or chrominance of the video light.

20. A method for transmitting a broadcast stream, comprising the steps of:
 (a) generating pieces of information corresponding to one or more available types of information;
 (b) assigning a label to each of the available types of information;

(c) generating a broadcast stream comprising the pieces of information with a label for each piece, the pieces of information being embedded in a human-imperceptible form in a human-perceptible broadcast program, wherein:

the human-perceptible broadcast program can be directly perceived by a person; and the information in the human-imperceptible sets of information cannot be directly conveyed to a person without first being processed by an information processing device; and (d) transmitting the broadcast stream for receipt, processing, and selective capturing by one or more information processing devices based on one or more sets of preselected types of information.

21. The method of claim 20, wherein the sets of information embedded into human-perceptible audio sound signals or human-perceptible video light signals using luminance or chrominance modulation or spread spectrum techniques.

22. The method of claim 20, wherein:

step (c) comprises the step of generating the broadcast stream comprising human-perceptible public information and human-imperceptible private information, wherein the private information is encoded within playback signals corresponding to playback of the broadcast stream; and step (d) comprises the step of transmitting the broadcast stream for receipt and playback by a public-information rendering device that converts the broadcast stream into the playback signals encoded with the private information.

23. The method of claim 22, wherein the broadcast stream comprises a human-perceptible audio sound stream, the playback signals are human-perceptible audio sounds, the public-information rendering device comprises a speaker, and the private information is encoded in the audio sounds.

24. The method of claim 22, wherein the broadcast stream comprises a human-perceptible video light stream, the playback signals are human-perceptible video light, the public-information rendering device comprises a video monitor, and the private information is encoded in the luminance or chrominance of the video light.

25. An apparatus for transmitting a broadcast stream, comprising:

(a) means for generating pieces of information corresponding to one or more available types of information;

(b) means for assigning a label to each of the available types of information;

(c) means for generating a broadcast stream comprising the pieces of information with a label for each piece, the pieces of information being embedded in a human-imperceptible form in a human-perceptible broadcast program, wherein:

the human-perceptible broadcast program can be directly perceived by a person; and the information in the human-imperceptible sets of information cannot be directly conveyed to a person without first being processed by an information processing device; and (d) means for transmitting the broadcast stream for receipt, processing, and selective capturing by one or more information processing devices based on one or more sets of preselected types of information.

26. The apparatus of claim 25, wherein the sets of information are embedded into human-perceptible audio sound signals or human-perceptible video light signals using luminance or chrominance modulation or spread spectrum techniques.

27. The apparatus of claim 25, wherein:

means (c) is adapted to generate the broadcast stream comprising human-perceptible public information and human-imperceptible private information, wherein the private information is encoded within playback signals corresponding to playback of the broadcast stream; and means (d) is adapted to transmit the broadcast stream for receipt and playback by a public-information rendering device that converts the broadcast stream into the playback signals encoded with the private information.

28. The apparatus of claim 27, wherein the broadcast stream comprises a human-perceptible audio sound stream, the playback signals are human-perceptible audio sounds, the public-information rendering device comprises a speaker, and the private information is encoded in the audio sounds.

29. The apparatus of claim 27, wherein the broadcast stream comprises a human-perceptible video light stream, the playback signals are human-perceptible video light, the public-information rendering device comprises a video monitor, and the private information is encoded in the luminance or chrominance of the video light.

* * * * *